June 27, 1961

S. W. EVANS 2,990,498

CAPACITOR

Filed July 2, 1956

INVENTOR:
STEVEN W. EVANS,

BY Charles W. Helzer

HIS ATTORNEY.

United States Patent Office 2,990,498

Patented June 27, 1961

2,990,498
CAPACITOR

Steven W. Evans, Syracuse, N.Y., assignor to General Electric Company, a corporation of New York Filed July 2, 1956, Ser. No. 595,312
5 Claims. (Cl. 317—101)

The present invention relates to capacitors and capacitive structures.

More particularly, the invention relates to capacitors and capacitive structures that are especially adapted for use with printed wiring boards, and facilitates automatic placement of such structures in proper electrical relationship on printed wiring boards.

Because of the increased emphasis being directed to the automatic placement of parts in the manufacture of electronic equipment of all types, considerable emphasis is being directed to the physical design features of component parts (such as capacitors and capacitive structures) of electronic equipment for the purpose of facilitating automatic placement of parts. Additionally, because automatic placement of parts is essentially a cost saving measure, it is desirable to so design the component parts that the cost of such component parts is reduced to the least possible value.

It is therefore one object of the present invention to provide capacitors and capacitive structures which are simple in design, and relatively inexpensive to fabricate.

Another object of the invention is to provide new and improved capacitors and capacitive structures which facilitate automatic placement of such structures in proper circuit relationship in electronic equipment, and therefore reduces the cost of manufacturing such equipment.

A still further object of the invention is to provide new and improved capacitors and capacitive structures which eliminate the need for special wire leads, separate insulating coverings, and the like for such parts, and hence serve to further reduce the cost of manufacturing electronic equipment incorporating such parts.

In practicing the invention, a capacitive structure is provided which includes a piece of solid dielectric material having a configuration such that at least one side portion thereof is smaller in at least one dimension than the portion of such dielectric material juxtaposed to the side portion. The capacitive structure further includes conductive electrode areas formed on opposed surfaces of the piece of solid dielectric material, and in a preferred embodiment of the invention, the piece of solid dielectric material is flat with the conductive electrode areas being formed on its opposed flat surfaces.

Other objects, features and many of the attendant advantages of the invention will be appreciated more readily as the same becomes better understood by reference to the following detailed description, when considered in connection with the accompanying drawings, wherein like parts in each of the several figures are identified by the same reference character, and wherein.

Figure 4A:
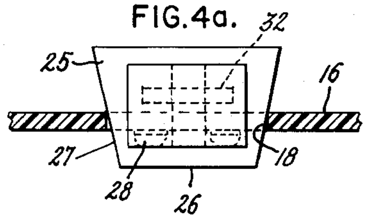
Figure 4B:
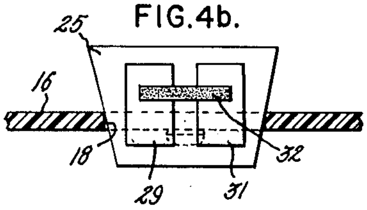
Figure 5:
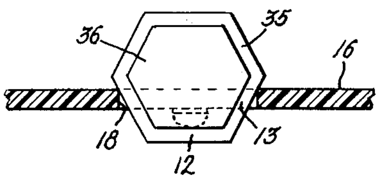
Figure 6:
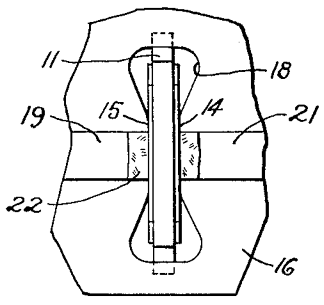

FIGURE 4*a* is a side view of a capacitive structure comprising a second embodiment of the present invention;

FIGURE 4*b* is a view of the opposite side of the capacitive structure shown in FIGURE 4*a*;

FIGURE 5 is a side view of still a different capacitive structure embodying the principles of the invention; and FIGURE 6 is a plan view of a portion of a print wiring board comprising a part of the present invention and illustrates the construction of an opening formed in such board.

Figure 1:
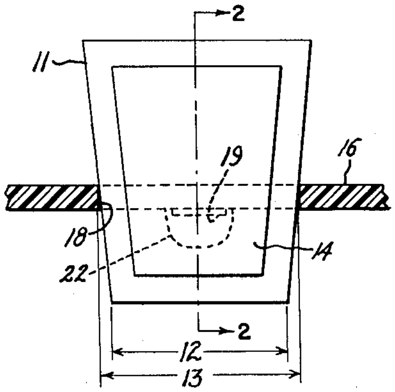
FIGURE 1 is a side view of one embodiment of a capacitive structure constructed in accordance with the present invention.
Figure 2:
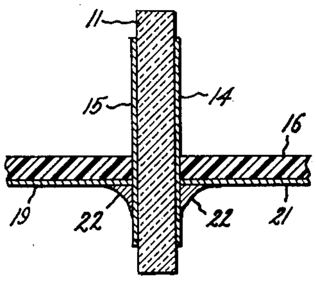
FIGURE 2 is a cross-sectional view of the capacitive structure shown in FIGURE 1.

The capacitive structure illustrated in FIGURE 1 of the drawings includes a capacitor formed by a piece of solid dielectric material 11. The piece of solid dielectric material 11 is preferably flat as shown in FIGURE 2 of the drawings, and has a keystone wedge configuration such that one side portion thereof (indicated by the dimension 12) is smaller in length than the portion (indicated by the dimension 13) of the piece of solid dielectric material juxtaposed to the side portion 12. The piece of solid dielectric material 11 may be formed from a barium titanate ceramic composition fired to a solid state, or some other similar high dielectric constant solid material. Such other similar materials may comprise any of the titanates of the alkaline earth metals such as barium, strontium and calcium titanate, or any other known solid dielectric material presently used in solid dielectric capacitors.

As is best shown in FIGURES 1 and 2 of the drawings, the opposed flat surfaces of the piece of solid dielectric material 11 have bare conductive electrode areas 14 and 15 secured thereto by any conventional means. Preferably, the conductive electrode areas 14 and 15 comprise conductive silver films formed on the surface of the solid dielectric material 11 by a chemical reducing action, or by applying a coat of silver paste and subsequently firing to a solid state, or by any other similar known technique for forming a conductive coating on a solid dielectric material backing member.

Capacitors constructed in the manner described with relation to FIGURES 1 and 2 of the drawings are then ready for mounting in electrical circuit relationship. For this purpose, printed wiring boards are used. The portion of a printed wiring board illustrated in FIGURE 3 of the drawing comprises an insulating backing member 16 formed from phenolic, or some other similar, well-known plastic or other solid insulating material. The insulating backing member 16 has a plurality of electrically conductive pathways, one of which is shown at 17, formed thereon by electrodeposition, etching, stamping, molding or some other suitable known method. Where desired, each of the pathways 17 has an opening 18 therein which extends transversely of the conductive pathway so as to separate the pathway into two electrically separate parts 19 and 21. The manner in which the opening 18 is formed in insulating backing member 16 is immaterial, for the opening may be originally formed into the backing member 16 prior to the formation of the electrically conductive pathways 17 thereon, in which event, it is desired, although it is not essential, that the separated ends 19 and 21 of the electrically conductive pathways 17 extend right up to the edge of the opening 18 in the manner shown in FIGURE 2 of the drawings; however, if desired, the openings 18 may be punched into the insulating backing member 16 subsequent to fabrication of the conductive pathways 17 by any of the conventional techniques mentioned above.

The opening 18 may have any desired shape, and the sidewalls thereof may be rectilinear with respect to the surface of the insulating backing member, or they may be tapered. For practical reasons, however, it is desired that the sidewalls of the openings 18 be rectilinear, and that the opening be bow tie-shaped when viewed from above or below as shown in FIGURE 6 of the drawings. By forming the opening 18 in this fashion, the rectilinear edge of the piece of solid dielectric material 11 has a rectilinear surface to wedge against, and thus can be retained more firmly. Further the constricted central portion of a bow tie-shape opening 18 serves to guide the capacitor into proper position within the opening 18 thus facilitating assemblage of the capacitors on the insulating backing members 16.

Figure 3:
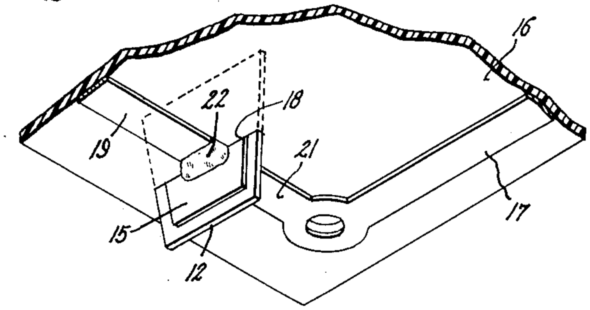
FIGURE 3 is a bottom perspective view of the capacitive structure shown in FIGURE 1 and includes a new and improved capacitor mounted in circuit relationship on a print wiring board in accordance with the principles of the invention.

In inserting a capacitor constructed in the manner described with relation to FIGURES 1 and 2 in a printed wiring board constructed in the manner described with relation to FIGURE 3 of the drawings, the capacitor is aligned with the smaller side portion 12 thereof over the opening 18 in the printed wiring board. The capacitor is then inserted or wedged into the opening 18 in the insulating member so that it is frictionally retained by the insulating member in the manner illustrated in FIGURE 3 of the drawings. While only a single capacitor has been illustrated and described with relation to FIGURE 3, it is to be understood that any number of such capacitors required in a particular electronic circuit can be accommodated in an identical fashion in a suitably designed printed wiring board. Additionally, it is believed obvious that the operation of inserting the capacitors in the printed wiring board may be performed by machine so that by construction of a suitable holding jig, all of the capacitors in a given electrical circuit can be inserted simultaneously into the openings 18 formed in a printed wiring board designed to receive such capacitors. Subsequent to this fitting action, the wiring board is conveyed to a soldering station where the bare conductive electrode areas of the capacitors are soldered to the ends of the separate conductive pathways 19 and 21 in the manner illustrated in FIGURES 2 and 3 of the drawings at 22. This soldering operation is preferably accomplished by a dip-soldering technique so that all of the capacitors may be soldered to the wiring board simultaneously in the manner illustrated.

From the above description, it can be appreciated that the capacitor illustrated in FIGURES 1 and 2 of the drawings is both simple in design, and rather inexpensive to fabricate. Further, because of its simple construction, the capacitor is easily mounted on a print wiring board in circuit relationship with other components with a minimum of effort and expense. Additionally, because no special wire leads or insulation is required, the cost of the capacitors is considerably reduced. Hence, it can be appreciated that by reason of the invention, the overall cost of electronic equipment utilizing such capacitors as parts thereof is reduced substantially.

FIGURES 4*a* and 4*b* of the drawing illustrate a second capacitive structure incorporating the novel features of the invention. The capacitive structure comprises a resistance-capacitance network formed on a flat piece of solid dielectric material 25. The flat piece of solid dielectric material 25 has a keystone wedge configuration such that one side portion 26 thereof is smaller than the portion 27 thereof juxtaposed to the side portion 26. The piece of solid dielectric material 25 is formed from barium titanate ceramic or some other material possessing a high dielectric constant which is suitable for use in a solid dielectric capacitor. On one flat surface of the dielectric material 25, a bare conductive electrode area 28 is formed which extends over a substantial portion of its surface, and as best shown in FIGURE 4*b* of the drawings, two separate bare conductive electrode areas 29 and 31 are formed on the remaining opposed flat surface of the piece of solid dielectric material 25. By placing the conductive electrode areas 29 and 31 in this manner opposite conductive electrode area 28 with solid dielectric material disposed therebetween, a capacitive structure is formed which in effect constitutes two separate capacitors. To complete the structure, the two conductive electrode areas 29 and 31 are connected together by a high resistance conductive path 32 which may be formed by a suitable conductive carbon paste or other known resistor material imprinted over the piece of solid dielectric material 25, or otherwise disposed thereon by any known technique illustrated in FIGURE 4*b* of the drawings. This results in the formation of a resistance-capacitance network.

The resistance-capacitance networks constructed in the above-described fashion are adapted for use with a printed wiring board similar in many respects to that described with relation to FIGURE 3 of the drawings, and that comprises an insulating backing member 16 having a plurality of conductive pathways, not shown, formed thereon. The conductive pathways are separated by an opening 18 in which the resistance-capacitance network is wedged, and the ends of the conductive pathway separated by the opening 18 are soldered to the bare conductive electrodes 28, 29 and 31 in a manner similar to capacitor shown in FIGURE 3. As a consequence, it can be appreciated that the invention provides a new and improved resistance-capacitance network structure wherein the need for separate lead wires, separate insulating coverings, and the like are done away with, and which facilitates placement of the resistance-capacitance networks in proper electrical circuit relationship on appropriately designed printed wiring boards.

Still a different form of the invention is shown in FIGURE 5 of the drawings. FIGURE 5 discloses a capacitive structure including a capacitor formed by a hexagonally-shaped, flat piece of solid dielectric material 35 comprised by barium titanate, or some other known high dielectric constant solid material suitable for use in solid dielectric capacitors. The flat piece of solid dielectric material 35 has electrically conductive electrode areas 36 formed on the opposed flat surfaces thereof which act as capacitor plates. If desired, the electrically conductive electrode areas 36 may also be hexagonally shaped. In all other respects, the capacitor shown in FIGURE 5 is similar to the capacitor described with relation to FIGURES 1 through 3, and is adapted to be wedged in an opening 18 in a printed wiring board comprised by an insulating member 16. In mounting the hexagonally-shaped capacitor shown in FIGURE 5, any one of the smaller side portions 12 of the capacitor is inserted in the opening 18. The capacitor is then wedged into the opening 18 so that it is frictionally retained by the print wiring board with the bare electrically conductive electrode areas 36 contacting the separated ends of the conductive pathways 17. The assembly is then dip-soldered in the manner described with relation to FIGURE 3 so that the capacitor is permanently retained in position on the print wire board, and the conductive electrode areas 36 have good electrical contact to the conductive pathways 17. Consequently, it can be appreciated that the capacitive structure shown in FIGURE 5 is in many respects similar to that described with relation to FIGURES 1 through 3. However, because of its hexagonal shape, the embodiment of the invention shown in FIGURE 5 may have any one of the smaller side portions 12 thereof inserted in the opening 18, and hence requires no particular alignment prior to insertion in the opening 18 of the print wiring board. This feature minimizes the amount of handling required of the capacitor prior to assembling the same on the printed wiring board, and hence further reduces the cost of construction of electronic equipment utilizing such capacitors.

From the foregoing description, it can be appreciated that the invention provides new and improved capacitors and capacitive structures which are simple in design and relatively inexpensive to manufacture. The new and improved capacitors and capacitive structures facilitate automatic placement in proper electric circuit relationship in electronic equipment, and thereby reduces the cost of such equipment. Further, because of their simplicity, the new and improved capacitors and capacitive structures eliminate the need for special wire leads, separate insulating covers, and the like, and hence serve to further reduce the cost of such components, as well as the electronic equipment in which said component parts are incorporated.

While applicant has disclosed only a few specific embodiments of the present invention, obviously, other modifications and variations of the invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. In combination, a printed wiring board comprising an insulating backing member having an electrically conductive pathway formed thereon, said insulating backing member having an opening therein extending transversely to and electrically separating said electrically conductive pathway, a capacitor disposed in said opening and comprising a solid dielectric member having opposite faces, said opposite faces having at least a pair of opposite converging sides, said dielectric member having exposed conductive material thereon only on said opposite faces thereof, said dielectric member being arranged in said opening with said converging sides in wedging engagement with said insulating backing member, said exposed conductive material being electrically connected to respective separated ends of the electrically conductive pathway separated by said opening.

2. The combination set forth in claim 1 wherein the capacitor comprises a flat piece of dielectric material having a wedge configuration.

3. The combination set forth in claim 1 wherein the opening in said insulating backing member is bow tie-shaped.

4. A combined capacitor and mounting means therefor for wedging the capacitor in a slot in a printed electronic circuit board comprising a plate-like piece of solid dielectric material having opposite flat parallel sides and a pair of opposite converging edge faces for wedging the piece in said slot, said opposite flat parallel sides having exposed conductive material deposited thereon inwardly of the edges thereof to provide parallel capacitor electrodes with a continuous margin therearound on each of said sides free of conductive material, said plate-like piece of solid dielectric material also being free of conductive material on all its edge faces, the thickness of said plate-like piece being relatively small in comparison with the dimension of said sides and the spacing between said parallel capacitor electrodes being equal to said thickness.

5. A combined capacitor and mounting means therefor as defined in claim 4, wherein said plate-like piece of solid dielectric material is keystone-shaped.

References Cited in the file of this patent

UNITED STATES PATENTS

| | | |
|---|---|---|
| 1,655,022 | Pickard | Jan. 3, 1928 |
| 1,829,891 | Dubilier | Nov. 3, 1931 |
| 2,225,770 | Dorn | Dec. 24, 1940 |
| 2,777,039 | Thias | Jan. 8, 1957 |
| 2,830,698 | Coda et al. | Apr. 15, 1958 |
| 2,869,041 | De Cola | Jan. 13, 1959 |

FOREIGN PATENTS

| | | |
|---|---|---|
| 416,457 | Great Britain | Sept. 14, 1934 |
| 894,533 | France | Mar. 13, 1944 |

OTHER REFERENCES

Centralab advertisement in page 268 of "Electronics," April 1954.